United States Patent Office 2,865,932
Patented Dec. 23, 1958

2,865,932
AZIDES OF DI-CARBOXYARYL COMPOUNDS

Clinton W. MacMullen, Hamden, and Gordon R. Leader, Northford, Conn., assignors to Olin Mathieson Chemical Corporation, New Haven, Conn., a corporation of Virginia No Drawing. Application May 18, 1956
Serial No. 585,630

1 Claim. (Cl. 260—349)

This invention relates to a new class of azides and diazides of di-carboxyaryl compounds, and a process for preparing the compounds. The common structural feature for the diazides of the invention is the group linking the carboxyaryl groups, which linkage is through a divalent methylene, hydroxymethylene or keto group. The compounds of the invention are particularly suited for use as organic blowing agents in the manufacture of foam rubber and similar plastics. They have the general formula $N_3CO-A-Z-A-CON_3$, wherein A is an aryl nucleus, such as phenylene or naphthylene and Z is a divalent radical chosen from the group $-CH_2-$, $-CH(OH)-$ and $-CO-$.

Extensively used to prepare solid foam compositions, organic blowing agents are substances which decompose upon heating to liberate a gas. Upon the incorporation of a blowing agent in a plastic material, such as rubber or polyvinyl chloride, heat treatment of the plastic composition causes a vigorous evolution of gas which converts the molten plastic, after hardening, into a solid foam composition.

Although many substances liberate gas upon thermal decomposition, a material must meet stringent standards before adoption as a blowing agent. A good blowing agent must be not only non-discoloring and non-staining, but easily compounded and dispersed throughout the plastic composition. The compound must be stable at both storage and mixing temperatures, and have essentially no effect on the stability or rate of cure of the plastic composition. Decomposition of the blowing agent must proceed smoothly and completely at the processing temperatures to yield a gas which is both inert and odorless and does not diffuse out of the plastic composition. Furthermore, it is requisite that the residue remaining after decomposition of the blowing agent be non-toxic, odorless and compatible with the resultant foam composition. In addition, this residue must not alter the stability or plasticity of the foam composition.

The diazides of this invention meet substantially all of these requirements. Upon decomposition, the diazide releases nitrogen and forms a diisocyanate. When the diazide is incorporated into an isocyanate-alkyd composition, prior to forming a polyurethane resin, the diisocyanate formed upon thermal decomposition is capable of reacting with the alkyd resin and thereby cross-links the resultant resin. Use of the diazides in this manner result in polyurethane structures having unusually low density.

Preparation of these diazides from the corresponding dicarboxylic acid may be accomplished by first converting the dicarboxylic acid to a dialkyl ester. Upon treatment of the dialkyl ester with an aqueous solution of hydrazine, an intermediary dihydrazide forms and can be isolated. Reaction of the dihydrazide with hydrochloric acid, followed by the addition of a solution of sodium nitrite converts the dihydrazide hydrochloride into the desired diazide. Alternatively, the dicarboxylic acid may be initially converted into the corresponding acid chloride by reaction with phosphorus pentachloride or thionyl chloride. The diazide is then formed by reacting the acid chloride with a solution of sodium azide in an inert solvent. The diazides have been prepared by both methods in high yields.

To illustrate the ease of preparation, the diazides corresponding to the following dicarboxylic acids were prepared:

o,p'-Benzophenone dicarboxylic acid
p,p'-Benzophenone dicarboxylic acid
p,p'-Benzhydrol dicarboxylic acid
o,p'-Diphenylmethane dicarboxylic acid
p,p'-Diphenylmethane dicarboxylic acid In each case, the diazide was extensively evaluated as a blowing agent by observing the decomposition temperature, the stability at room temperature over long periods of storage, and the volume of nitrogen evolved upon heating. Generally, the melting point range, varying from 80° to 130° C., and the decomposition temperatures were identical. The particular diazides prepared have molecular weights of about 300, and evolve approximately 145 cc. of nitrogen per gram at standard temperature and pressure (0° C. and 760 mm. Hg).

The following specific examples are illustrative embodiments of the practice of the invention:

I. PREPARATION OF INTERMEDIARY DIHYDRAZIDES p,p'-Diphenylmethane dicarboxylic acid dihydrazide

A mixture of 5 g. of p,p'-diphenylmethane dicarboxylic acid dimethyl ester, 15 ml. of 97% hydrazine and 5 ml. water was refluxed for two hours, and then poured onto a large watch glass. After evaporating the liquid phase in the hood, the resultant solid residue was dissolved in 250 ml. hot 50% ethanol and filtered. Upon cooling, the filtrate deposited fine white crystals, which were filtered, washed with a benzene-alcohol (2:1) solvent pair, and dried at room temperature. Additional crystals could be obtained by concentration of the mother liquor. The total yield was 4.2 g., M. P. 242–3° C.

Analysis.—Calc'd. for $C_{15}H_{16}N_4O_2$: N, 20.01. Found: N, 19.75.

o,p'-Diphenylmethane dicarboxylic acid dihydrazide

A solution of 12 g. of o,p'-diphenylmethane dicarboxylic acid in 200 ml. anhydrous methanol, containing 5 ml. concentrated sulfuric acid, was refluxed for four hours. After evaporating about one-half the methanol, the resultant solution was cooled and poured onto 400 g. of cracked ice, resulting in an oily dimethyl ester. The oily dimethyl ester was dissolved in 5 ml. of a benzene-alcohol (2:1) solvent pair, and heated for 4 hours at about 100° C. with 15 ml. 97% hydrazine. An additional 50 ml. of the solvent pair was added, and the mixture cooled, resulting in precipitation of an amorphous powder. The precipitate was filtered, washed with benzene-alcohol (2:1), slurried with ether, and then dried at room temperature. The amorphous powder melted at 197–203° C.

Analysis.—Calc'd. for $C_{15}H_{16}N_4O_2$: N, 19.75. Found: N, 19.79.

p,p'-Benzhydrol dicarboxylic acid dihydrazide

A mixture of 5 g. of p,p'-benzhydrol dicarboxylic acid dimethyl ester, 15 ml. 97% hydrazine and 5 ml. water was stirred and heated to near the boiling point, resulting in a homogeneous yellow solution which was held at 90–100° C. for 30 minutes. As the solution cooled, white, well-formed crystals appeared. After evaporating the excess hydrazine and water in a hood, the residue was dissolved in 100 ml. of hot 50% ethanol, cooled and filtered. The crystals were washed with cold benzene-alcohol (2 : 1), and dried at 60° C., yielding 4 g. melting at 223–4° C.

p,p'-Benzophenone dicarboxylic acid dihydrazide

To a mixture of 45 ml. 99% hydrazine and 5 ml. water was added 5 g. of p,p'-benzophenone dicarboxylic acid dimethyl ester (M. P. 226° C.), and the resultant slurry heated with stirring to near its boiling point. The color of the solution slowly changed from dark brown to orange to yellow-orange as heating was continued. The mixture was held at 90° C. for about one hour, and then diluted to 50 ml. by the addition of water, resulting in a precipitate. The product was recrystallized from dioxane and dried at 55° C., yielding 2 g. of the dihydrazide, M. P. 260° C.

*Analysis.*—Calc'd for $C_{15}H_{14}N_4O_3$: N, 18.8. Found: N, 18.5.

The aqueous filtrate, on standing, deposited about 1 g. of light yellow plates, melting at 205° C., which were found to be the dihydrazide hydrazone of p,p'-benzophenone dicarboxylic acid.

*Analysis.*—Calc'd for $C_{15}H_{16}N_6O_2$: N, 26.9. Found: 27.08.

The dihydrazide hydrazone could be selectively hydrolyzed to cause removal of the hydrazone group by dissolving it in 6-N hydrochloric acid and warming, resulting in the precipitation of the insoluble dihydrazide hydrochloride. By dissolving the hydrochloride in water and neutralizing with ammonia, the dihydrazide could be regenerated.

II. PREPARATION OF THE DIAZIDES o,p'-Diphenylmethane dicarboxlic acid diazide 2 g. of o,p'-diphenylmethane dicarboxylic acid dihydrazide was dissolved in a mixture of 16 ml. 2-M hydrochloric acid and 50 ml. water, the solution decolorized with charcoal and filtered. The colorless filtrate was cooled to 10° C. with stirring, and a solution of 1 g. sodium nitrate in 20 ml. water slowly added, resulting in the formation of a well-coagulated white precipitate. Upon recrystallization from ether, light pink needles, melting at 84° C. with evolution of nitrogen, were formed.

*Analysis.*—Calc'd for $C_{15}H_{10}N_6O_2$: N, 27.4. Found: N, 27.1.

p,p'-Diphenylmethane dicarboxylic acid diazide 1 g. of p,p'-diphenylmethane dicarboxylic acid dihydrazide was dissolved in 8 ml. 1-M hydrochloric acid and the resultant solution diluted with 20 ml. water. The dihydrazide hydrochloride was cooled in an ice bath, with stirring, and a solution of 0.5 g. sodium nitrite in 20 ml. cold water was slowly added, resulting in the immediate formation of a white precipitate. The granular white precipitate was filtered, washed with water and yielded 1 g. of diazide after air drying. Upon recrystallization from ether, the diazide melted at 80° C. with partial decomposition. The product was colorless and did not change color on standing.

p,p'-Benzhydrol dicarboxylic acid diazide

To 1.5 g. of p,p'-benzhydrol dicarboxylic acid dihydrazide was added 2 ml. water followed by 3 ml. concentrated hydrochloric acid, and the mixture stirred rapidly. After momentary solution of the solid, a white pasty mass formed, which was transferred to a watch glass and the excess hydrochloric acid volatilized on standing. The dried hydrochloride was dissolved in 100 ml. water, and the solution cooled to 10° C. While stirring, a solution of 0.75 g. sodium nitrite in 5 ml. water was added over a 2–3 minute period to the cooled solution, resulting in the formation of white, well-coagulated precipitate. The precipitate was filtered, washed with water, and air-dried, yielding 1.5 g. of a sandy compact powder, light pink in color, melting at 120° C. with vigorous evolution of nitrogen. On storage this material slowly turned purple.

p,p'-Benzophenone dicarboxylic acid diazide 1.5 g. of p,p'-benzophenone dicarboxylic acid dihydrazide was dissolved at room temperature in 200 ml. distilled water containing 1 drop of concentrated hydrochloric acid. The mixture was filtered, and the filtrate cooled in an ice bath. While stirring, a solution of 1 g. sodium nitrite in 5 ml. water was slowly added to the cooled filtrate, causing the immediate formation of a gelatinous white precipitate. The precipitate was stirred for 10 minutes, filtered, and washed with cold water. After drying at room temperature, 1.2 g. of product was recovered as a light yellow powder. Upon recrystallization from ether, the compound melted at 120° C. with vigorous evolution of nitrogen. Although the solubility of the compound in ether was low, it could be readily dissolved in acetone.

o,p'-Benzophenone dicarboxylic acid diazide

This compound was made by a different method than that used for the other diazides. A mixture of 27 g. of o,p'-benzophenone dicarboxylic acid and 50 g. phosphorus pentachloride was vigorously stirred in a beaker. The mixture became hot and melted with vigorous evolution of hydrogen chloride, leaving a purple oil. After filtering, the mixture was diluted with 20 ml. ethyl ether, and crystallized upon cooling, yielding 15.2 g. of the acid chloride melting at 100° C. (lit. 102° C.). The acid chloride was dissolved in 100 ml. anhydrous acetone, and cooled in an ice bath. While stirring, a solution of 5 g. sodium azide in 15 ml. water was added dropwise. Stirring was continued for 10 minutes and a heavy milky oil separated from the acetone-water phase. The suspension was poured into 500 ml. ice water, and formed a precipitate upon standing. After washing the precipitate with water, 20 ml. benzene-alcohol (2 : 1) and two 10 ml. portions of ether, it was air-dried and yielded 8.3 g. of diazide, melting at 90° C. with gas evolution. Repeated ether extraction of the crude product gave a residue melting at 96° C., which was white but darkened slightly upon standing.

III. GAS EVOLUTION TESTS

Gas evolving capacity of the new compounds was measured in a simple apparatus consisting of a test tube connected through ground glass joints and Tygon tubing to a gas measuring burette filled with water. A T-connection in the line, closeable by means of a glass plug permitted bringing the system to atmospheric pressure at the start of each run, after adjusting the gas burette to zero. The test tube containing the sample suspended in diphenyl oxide or dibutyl phthalate was heated in a silicone oil bath. The diphenyl oxide and dibutyl phthalate were chosen arbitrarily as inert, high boiling media for the decomposition. It was assumed that behavior in these media in respect to color development was indicative of discoloration that the azide blowing agents would show when used in rubber or plastics.

For each determination, a 0.1–0.2 g. sample of the azide was weighed out in a small glass cup made from 10 mm. Pyrex tubing. The cup was placed in the bottom of the test tube and covered with diphenyl oxide. The test tube was then connected to the gas burette, the latter was adjusted to zero, and the system was then closed to the atmosphere. The bath around the test tube was then heated to about 80–100° C. at which temperature gas evolution started and then became brisk at 120° C. as heating was continued. The bath temperature was usually carried to 160–170° C. and the bath was then allowed to cool. As gas evolution occurred, the leveling bulb on the gas burette was adjusted so as to keep the system near atmospheric pressure at all times. The heating bath was finally removed from around the gas evolution tube and replaced by a beaker of water at room temperature. After cooling for one hour, readings were taken of the gas volume, room temperature and barometric pressure. From this data and the weight of the sample, the volume of gas evolved per gram of sample at Standard Temperature and Pressure was calculated. Barometric pressure was corrected for the vapor pressure of water at the prevailing temperature since the gas samples were measured over water.

For each of the samples prepared, gas evolution tests were made soon after preparation and at random intervals thereafter to determine to what extent gas evolution capacity was retained during storage at ambient room temperatures.

The results of these tests such as color development on heating, behavior on heating, and evaluation of potential usefulness are given in Table I.

TABLE I.—GAS EVOLUTION TESTS

| Compound and Formula | Temp. of Rapid Gas Evolution, °C. | cc. $N_2$/g. at S. T. P.[1] | |
|---|---|---|---|
| | | Found | Theory |
| o,p′-benzophenone dicarboxylic acid diazide 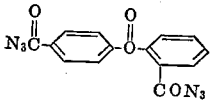 | 110–115 | 140 / 139 | 140 |
| M. P. 98° C. gives smooth evolution of $N_2$ in diphenyl oxide to give light tan solution which becomes orange on standing. | | | |
| p,p′-benzophenone dicarboxylic acid diazide 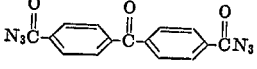 (Recrystallized from ether) | 120 | 134 / 131 | 140 |
| M. P. 120° C. smooth evolution of $N_2$ to give light yellow suspension in diphenyl oxide. Little darkening on standing. | | | |
| p,p′-benzhydrol dicarboxylic acid diazide 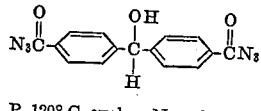 | 115 | 138 | 138 |
| M. P. 120° C. evolves $N_2$ on heating in diphenyl oxide to yield suspension which becomes purple on standing. | | | |
| o,p′-diphenylmethane dicarboxylic acid diazide 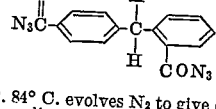 | 95–110 | 147 | 158 |
| M. P. 84° C. evolves $N_2$ to give clear yellow-brown solution in diphenyl oxide medium. | | | |
| p,p′-diphenylmethane dicarboxylic acid diazide 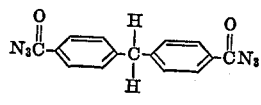 | 120–125 | 145 / 131 | 158 |
| M. P. 80° C. evolves $N_2$ to give flocculent light yellow suspension in diphenyl oxide. | | | |

[1] S. T. P.=Standard Temperature and Pressure (0° C. and 760 mm. Hg).

Blown low-density plastics were prepared using diazides of this invention as blowing agent, in accordance with the following illustrative example. 9 parts by weight of diazide were dispersed in a mixture of 35 parts of dioctyl phthalate and 65 parts of tricresyl phosphate by wet grinding, as with a mortar and pestle. 100 parts of polyvinyl chloride resin and 4 parts of a conventional stabilizer were added and mixed uniformly.

After subjecting the mixture to vacuum for 15 minutes to remove entrapped air, it was poured into a ring mold. Molding was accomplished by heating for 10 minutes at 350°–360° F. under a pressure of 25,000 lbs. per square inch. The composition was cooled under pressure to below 150° F. and the formed disc removed from the mold. It was then heated to 195°–205° F. for one hour, cooled and the volume expansion was determined.

A volume expansion of 475% was obtained with the use of o,p′-benzophenone dicarboxylic acid diazide while "Celogen O T," a commercially available blowing agent of the sulfonyl dihydrazide type yielded a volume expansion of 395 percent.

We claim:

A diphenyl diacyl diazide of the group consisting of o,p′-benzophenone dicarboxylic diazide, p,p′-benzophenone dicarboxylic diazide, p,p′-benzhydrol dicarboxylic diazide, o,p′-diphenylmethane dicarboxylic diazide and p,p′-diphenylmethane dicarboxylic diazide.

References Cited in the file of this patent
UNITED STATES PATENTS

| 2,741,624 | Hunter | Apr. 10, 1956 |
| 2,764,599 | Clifford et al. | Sept. 25, 1956 |
| 2,765,304 | Siegrist et al. | Oct. 2, 1956 |
| 2,768,202 | Goldberg et al. | Oct. 23, 1956 |

OTHER REFERENCES

Byrkit et al.: "Ind. Eng. Chem.," vol. 42 (1950), page 1866.